(12) United States Patent
Kazmaier et al.

(10) Patent No.: US 8,545,738 B2
(45) Date of Patent: *Oct. 1, 2013

(54) STABILIZED PHOTOCHROMIC INK FOR REUSABLE PAPER ANNOTATION

(75) Inventors: Peter M. Kazmaier, Mississauga (CA); Gabriel Iftime, Mississauga (CA); Kentaro Morimitsu, Mississauga (CA); Adela Goredema, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 396 days.

This patent is subject to a terminal disclaimer.

(21) Appl. No.: 12/854,418

(22) Filed: Aug. 11, 2010

(65) Prior Publication Data

US 2012/0038718 A1    Feb. 16, 2012

(51) Int. Cl.
*G02B 5/23* (2006.01)
*B41J 2/175* (2006.01)

(52) U.S. Cl.
USPC ............ 252/586; 347/86; 347/110; 427/145; 427/160; 430/19; 430/270.1; 430/270.15; 430/330; 430/945; 503/200; 503/201; 503/218; 503/223

(58) Field of Classification Search
USPC .................. 252/586; 347/86, 110; 427/145, 427/160; 430/19, 270.1, 270.15, 330, 905, 430/945; 503/200, 201, 218, 223; 528/185
See application file for complete search history.

(56) References Cited

U.S. PATENT DOCUMENTS

| 3,918,972 | A  | * | 11/1975 | Evens et al. | 430/337 |
|---|---|---|---|---|---|
| 5,807,625 | A  | * | 9/1998 | Amon et al. | 428/195.1 |
| 8,236,466 | B2 | * | 8/2012 | Morimitsu et al. | 430/19 |
| 8,293,438 | B2 | * | 10/2012 | Iftime et al. | 430/19 |
| 8,303,858 | B2 | * | 11/2012 | Morimitsu et al. | 252/586 |
| 2008/0311491 | A1 | * | 12/2008 | Iftime et al. | 430/19 |
| 2010/0227760 | A1 | * | 9/2010 | Morimitsu et al. | 503/201 |

* cited by examiner

*Primary Examiner* — Bijan Ahvazi
(74) *Attorney, Agent, or Firm* — MH2 Technology Law Group LLP

(57) ABSTRACT

Provided are ink compositions, methods for making photochromic inks, and methods of using the photochromic inks for erasable media annotation. In accordance with various embodiments, there is an ink composition including a carrier medium and one or more photochromic species in the carrier medium, wherein each of the one or more photochromic species can be selected from the group consisting of monomeric photochromic molecules, photochromic oligomers, and photochromic polymers, and wherein each one of the one or more photochromic species exhibits a reversible transition from a colorless state to a colored state upon exposure to a radiant condition wherein the radiant condition can be selected from the group consisting of a radiant energy and a combination of a radiant energy and thermal energy.

11 Claims, No Drawings

STABILIZED PHOTOCHROMIC INK FOR REUSABLE PAPER ANNOTATION

RELATED APPLICATION

Reference is made to copending, commonly assigned U.S. Patent Application to Iftime et al., filed Aug. 11, 2010, entitled, "Erasable Medium Including an Uncoated Substrate" Ser. No. 12/854,461, the disclosure of which is incorporated by reference herein in its entirety.

FIELD OF USE

The present teachings relate generally to photochromic inks and, more particularly, to photochromic ink compositions and methods for making photochromic inks and methods of using the photochromic inks for erasable media annotation.

BACKGROUND

Erasable media is that which can be reused many times to transiently store images, the images being written on and erased from the erasable media. To make erasable media as useful as possible, it is important to enable erasable annotation. Although the user can write on the erasable media using a conventional pen or pencil, these marks of course will be permanent and reduce the usefulness of that erasable medium for future reuses. A number of approaches have already been used to circumvent this using either an external LED pen or an internal LED pen. A first approach is a UV LED built into a pen that can be used to write directly on the paper. A second approach is using an ink placed in the barrel of a pen (e.g. a fountain pen) and colorizing the ink on writing by a UV LED locked inside the pen barrel. Once on the erasable medium, the handwriting fades and colorizes at a similar rate as the erasable media. Although both methods are suitable for annotation, each requires a power supply built into the pen in order to activate the LED. The LED requirement makes the ink incompatible with conventional fountain pens, ballpoint pens, and other writing implements. Hence there is a need for a photochromic ink which does not require activation using a UV LED. This will not only eliminate the need for a battery, but will reduce costs.

Thus, there is a need to overcome these and other problems of the prior art and to provide erasable ink compositions and methods of making erasable annotations.

SUMMARY

In accordance with various embodiments, there is an ink composition including a carrier medium and one or more photochromic species in the carrier medium, wherein each of the one or more photochromic species can be selected from the group consisting of monomeric photochromic molecules, photochromic oligomers, and photochromic polymers, and wherein each one of the one or more photochromic species exhibits a reversible transition from a colorless state to a colored state upon exposure to a radiant condition wherein the radiant condition can be selected from the group consisting of a radiant energy in the range of about 200 nm to about 475 nm; and a combination of a radiant energy in the range of about 200 nm to about 475 nm and a temperature in the range of about 30° C. to about 150° C.

Additional advantages of the embodiments will be set forth in part in the description which follows, and in part will be obvious from the description, or may be learned by practice of the present teachings. The advantages will be realized and attained by means of the elements and combinations particularly pointed out in the appended claims.

It is to be understood that both the foregoing general description and the following detailed description are exemplary and explanatory only and are not restrictive of the present teachings, as claimed.

The accompanying drawings, which are incorporated in and constitute a part of this specification, illustrate embodiments of the present teachings and together with the description, serve to explain the principles of the present teachings.

DESCRIPTION OF THE EMBODIMENTS

Reference will now be made in detail to the present embodiments, examples of which are illustrated in the accompanying drawings. Wherever possible, the same reference numbers will be used throughout the drawings to refer to the same or like parts.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less that 10" can assume negative values, e.g. −1, −2, −3, −10, −20, −30, etc.

As used herein, the term "erasable medium" refers to a material including an imaging medium that can be reused multiple times to transiently store and/or remove images and/or documents. The erasable medium can be selectively or locally imaged and erased.

As used herein, the term "imaged erasable medium" refers to an erasable medium bearing a visible image, the image a result of, for example, ultraviolet (UV) writing of the erasable medium.

As used herein, the term "non-imaged erasable medium" refers to an erasable medium which has not been previously imaged, or an erasable medium having an image erased therefrom and available for writing.

As used herein, the term "non-erasable" refers to traditional media of the type used in any conventional imaging such as ink jet, xerography, or liquid ink electrophotography, as known in the art. An example of a non-erasable traditional medium can be conventional paper.

As used herein, the term "erasable annotation" refers to an annotation bearing a visible image that is transient and lasts for a time period of at least about 24 hours. As used herein, the term "ambient condition" refers to an indoor ambient environment including a light condition that has a light wavelength ranging from about 380 nm to about 750 nm at room temperature ranging from about 20° C. (68° F.) to about 25° C. (77° F.).

The present disclosure describes methods of annotating an erasable medium using a writing instrument containing photochromic ink that is stabilized in its colored state inside the writing instrument. The photochromic ink of the present disclosure can be stabilized in one of the two ways: a solvent based ink or a particulate based ink. In various embodiments, the solvent based ink can include one or more photochromic species dissolved in a carrier medium. In some embodiments, the solvent based ink can also include one or more hydrogen bonding solvents. In certain embodiments, the particulate based ink can include one or more photochromic species in the form of particles dispersed in a carrier medium. These two kinds of ink compositions are discussed in detail below.

In accordance with various embodiments, there is an ink composition including a carrier medium and one or more photochromic species in the carrier medium, wherein the one or more photochromic species can include monomeric photochromic molecules, photochromic oligomers, and photochromic polymers. In some embodiments, the ink composition can include only the photochromic polymers in a carrier medium, the photochromic polymers including at least one photochromic moiety (PM) covalently bound to a polymer backbone. In other embodiments, the ink composition can include a combination of monomeric photochromic molecules and photochromic oligomers in a carrier medium. In some other embodiments, the ink composition can include a mixture of monomeric photochromic molecules, photochromic oligomers, and photochromic polymers in a carrier medium. In various embodiments, the one or more photochromic species can exhibit a reversible transition from a colorless state to a colored state upon exposure to a radiant condition. In some embodiments, the radiant condition can include exposure to a radiant energy alone. In other embodiment, the radiant condition can include an exposure to both a radiant energy and a thermal energy. The ink composition is in a colored state when the one or more photochromic species are in colored state and in colorless state when the one or more photochromic species are in colorless state.

In various embodiments, the exposure to thermal energy can include heating at a temperature in the range of about 30° C. to about 150° C., in some case in the range of about 30° C. to about 125° C., and in some other cases in the range of about 30° C. to about 100° C. In certain embodiments, the radiant energy can have a wavelength in the range of about 200 nm to about 475 nm or in the range of about 245 nm to about 450 nm or in the range of about 300 nm to about 400 nm. In some other embodiments, the radiant energy can have a wavelength band of from about 350 nm to about 370 nm.

As disclosed herein, the term "image lifetime" refers to the time taken for the annotation and/or visible image formed using the colored ink, i.e. the ink in the colored state, to fully revert or transition back to the colorless state in an ambient condition. In some embodiments, the colored ink can have an image lifetime of about 24 hours to about 10 weeks or about 24 hours to about 1 week or about 24 hours to about 5 days, or it could be outside these ranges.

In various embodiments, the colored ink can convert from the colored state to a colorless state or the visible image formed using the colored ink can be erased when heated to a temperature in the range of about 70° C. to about 200° C., in some case in the range of about 70° C. to about 150° C., and in some other cases in the range of about 70° C. to about 120° C.

Referring back to the ink compositions, in particular the solvent based ink compositions, the carrier vehicle can include one or more volatile solvents, such as, for example, halogenated and nonhalogenated solvents, such as tetrahydrofuran, trichloro- and tetrachloroethane, dichloromethane, chloroform, monochlorobenzene, toluene, acetone, methanol, ethanol, xylene, benzene, ethyl acetate, propylene glycol, propyl alcohol, toluene, glyco-ethers, and the like.

In certain embodiments the solvent based ink composition can also include hydrogen bonding solvents that will help stabilize the photochromic species in the colored state and increase its image lifetime. Examples for such hydrogen bonding solvents can include, but are not limited to, benzoic acid, butanol, isopropyl alcohol, lauric acid, myristic acid, octanoic acid, palmitic acid, and the like.

In various embodiments, the photochromic polymer can include at least one photochromic moiety (PM) covalently bound to a polymeric backbone, as shown below in the Formula I:

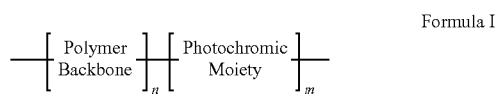

Formula I

In Formula I, the polymeric backbone portion can be present in an amount ranging from about 0 to about 95%, or ranging from about 10% to about 90%, or ranging from about 10% to about 50% by weight of the total photochromic polymer of Formula I with n ranging from about 0 to about 1000 or from about 5 to 750, or from about 10 to about 500. Still in Formula I, the photochromic moiety (PM) can be present in an amount ranging from about 0.1% to about 100%, or ranging from about 10% to about 90%, or ranging from about 10% to about 50% by weight of the total photochromic polymer of Formula I with m ranging from about 1 to about 1000 or from about 5 to about 750, or from about 10 to about 500. In some embodiments, the photochromic polymer having the Formula I can be a random copolymer. In other embodiments, the photochromic polymer having the Formula I can be a block copolymer.

In some embodiments, the photochromic moiety (PM) can include one or more photochromic molecules or compounds bound to the backbone portion within its polymer chain. In certain embodiments, the photochromic moiety (PM) can be introduced into the polymer chain of the backbone portion by, for example including the photochromic molecules or compounds during the preparation process of the backbone portion, such as in the form of reactive units, monomer units, or the like. Alternatively, the photochromic moiety (PM) can be added to an already formed polymeric backbone portion through known chemical functionalization reactions. In various embodiments, where multiple types of photochromic moiety (PM) are present in the polymer chain of the backbone portion, the multiple types of photochromic moiety can be the same or different in the photochromic polymer of Formula I.

In various embodiments, the photochromic polymer of formula I can include any other suitable polymer as the backbone, such as, for example, polyalkylmethacrylates, polycarbonates, polystyrenes, polysulfones, polyethersulfones, polyarylsulfones, polyarylethers, polyolefins, polyacrylates, polyvinyl derivatives, cellulose derivatives, polyurethanes, polyamides, polyimides, polyesters, silicone resins, epoxy resins, polyvinyl alcohols, polyacrylic acids and the like. Copolymer materials such as polystyrene-acrylonitriles, polyethylene-acrylates, vinylidenechloride-vinylchlorides, vinylacetate-vinylidene chlorides, styrene-alkyd resins can also be used. The copolymers can be block, random, or alternating copolymers.

An exemplary polymer backbone of the photochromic polymer of Formula I can have the following general formula II:

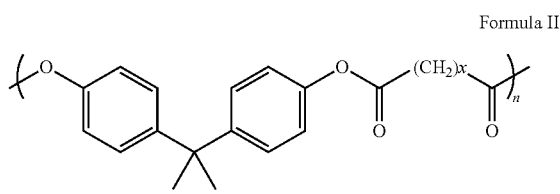

Formula II

In Formula II, x can range from about 1 to about 10, in embodiments from about 1 to about 9, in embodiments from about 3 to about 6 and n can range from about 1 to about 1000, and in some cases from about 5 to about 900.

In various embodiments, one particular example of a suitable photochromic polymer of Formula I, can have the following general Formula III:

ments, the photochromic polymer having the Formula III can be a block copolymer.

In embodiments, the photochromic polymer having the Formula I and its method of formation can include those disclosed in co-pending U.S. patent application Ser. No. 12/400,276, filed Mar. 9, 2009, and entitled "Reimageable and Reusable Medium and Method of Producing and Using the Reimageable and Reusable Medium", the disclosure of which is incorporated herein by reference in its entirety.

In certain embodiments, the photochromic polymer can include a photochromic molecule covalently bonded within a polymer backbone as shown below in Formula IV, the photochromic molecule including two photochromic moieties (PM) linked together via a linker:

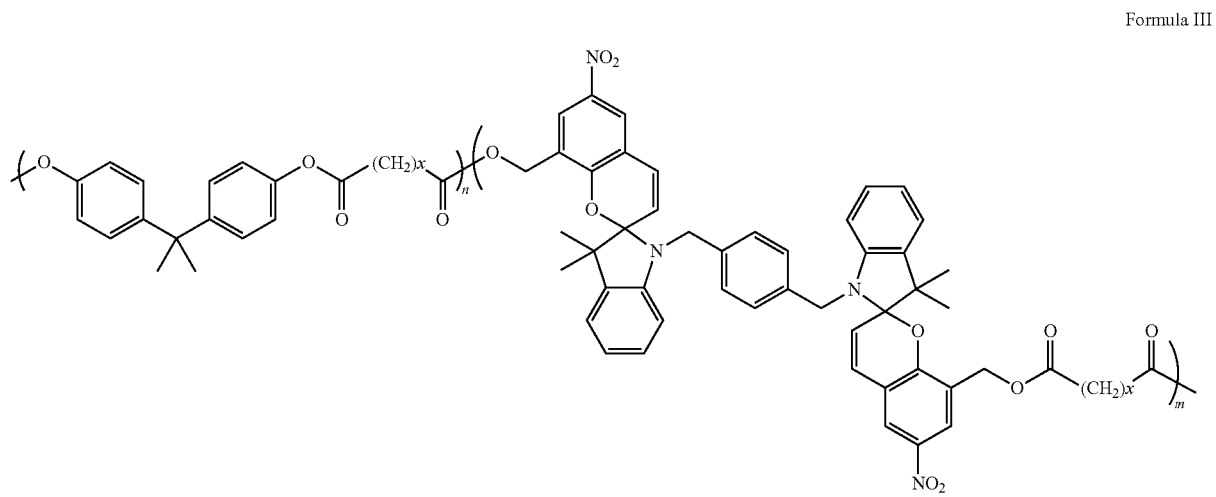

Formula III

In Formula III, x can range from about 1 to about 10, in embodiments from about 1 to about 9, in embodiments from about 3 to about 6, m can range from about 1 to about 1000 or from about 5 to about 750, or from about 10 to about 500; and n can range from about 0 to about 1000 or from about 5 to about 750, or from about 10 to about 500, although other ranges for m and n can be used.

In some embodiments, the photochromic polymer having the Formula III can be a random copolymer. In other embodi-

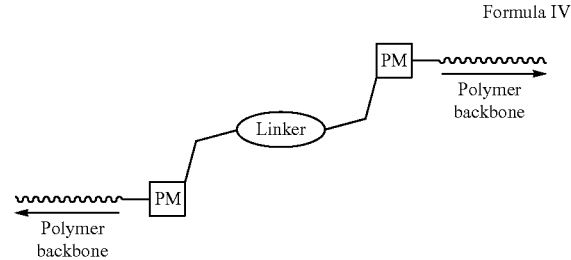

Formula IV

U.S. patent application Ser. No. 12/571,881, filed Oct. 1, 2009, and entitled "Photochromic Materials Incorporated in Polymer Backbone", describes in detail the photochromic polymer systems of Formula IV and methods of making them, the disclosure of which is incorporated herein by reference in its entirety.

Exemplary linkers in the photochromic polymer of Formula IV can include, but are not limited to, sulphur, oxygen, nitrogen, a linear alkyl, a branched alkyl, a cyclic alkyl, unsaturated hydrocarbon, an aryl, an arylalkyl, a heteroaryl group, an ester group, a ketone, an ether group, an amide group, a thioester group, or a thionoester group.

Exemplary photochromic polymer systems having a formula IV can include, but are not limited to, spiropyran-poly (ethylmethacrylate) (SP-PEMA) and spiropyran-poly(n-propylmethacrylate) (SP-PPMA), as shown below in Formula V:

dihydro-1'-decyl-,3',3'-dimethyl-6-nitrospiro-[2H-1-benzopyran-2,2'-(2H)-indole]; 1,3-dihydro-1,3,3-trimethylspiro [2H-indole-2,3'-[3H]naphth[2,1-b]-[1,4]oxazine]; 1,3-dihydro-1,3,3-trimethyl-5-nitrospiro[2H-indole-2,3'-[3H]naphth [2,1-b]-[1,4]oxazine]; 1,3-dihydro-1,3,3-trimethyl-5,6'-dinitro-spiro[2H-indole-2,3'-[3H]naphth[-2,1-b]-[1,4] oxazine]; 1,3-dihydro-1,3,3-trimethyl-5-methoxy, 5'-methoxy-spiro[2H-indole-2,3'-[3H]naphth[2,1-b]-[1,4] oxazine]; 1,3-dihydro-1-ethyl-3,3-dimethyl-5'-nitrospiro [2H-indole-2,3'-[3H]naphth[-2,1-b]-[1,4]oxazine]; and 1,3', 3'-trimethylspiro[2H-1-benzothiopyran-2,2'-indoline].

In various embodiments, the ink composition can include an optional polymer binder. Formula VI shows an exemplary polymer binder.

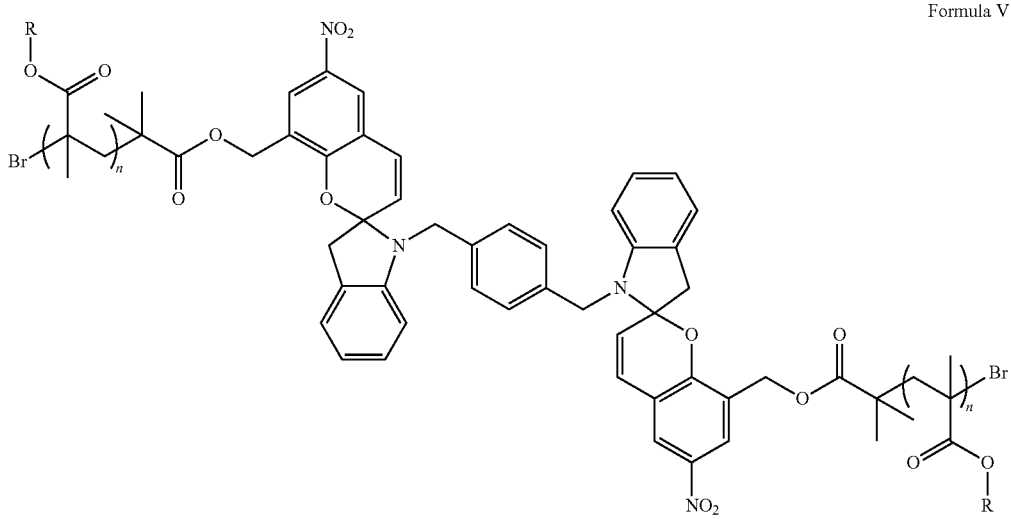

Formula V

SP-PEMA: R = ethyl
SP-PPMA: R = n-propyl

Any suitable molecule can be used for the photochromic moieties (PM) in the photochromic polymer systems having general formula I or IV, such as, for example, spiropyrans, spirooxazines, thiospiropyrans, benzos, naphthopyrans, stilbenes, azobenzenes, bisimidazols, spirodihydroindolizines, quinines, perimidinespirocyclohexadienones, viologens, fulgides, fulgimides, diarylethenes, hydrazines, anils, aryl thiosulfonates, spiroperimidines, and mixtures thereof. The photochromic moiety (PM) can include any suitable functional group including, but not limited to, an alkyl halide, a 2,2,6,6-tetramethylpiperidinyloxy (TEMPO) group, and a dithioester group. U.S. Pat. No. 7,300,727 discloses in detail a variety of photochromic moieties (PM), the disclosure of which is incorporated by reference herein in its entirety.

Specific examples of spiropyrans, spirooxazines, and thiospiropyrans include 1',3'-dihydro-1',3',3'-trimethyl-6-nitrospiro-[2H-1-benzopyran-2,-2'-(2H)-indole]; 1',3'-dihydro-1',3',3'-trimethyl-5'-nitrospiro-[2H-1-benzopyran-2,2'-(2H)-indole]; 1',3'-dihydro-1',3',3'-trimethyl-6-cyano-spiro-[2H-1-benzopyran-2,2'-(2H)-indole]; 1',3'-dihydro-1',3',3'-trimethyl-8-nitrospiro-[2H-1-benzopyran-2,2'-(2H)-indole]; 8-methoxy-spiro-[2H-1-benzopyran-2,2'-(2H)-indole]; 1',3'-

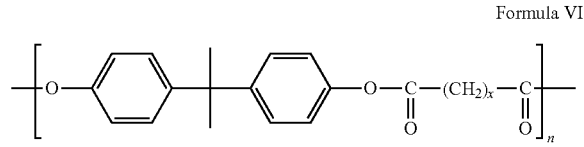

Formula VI

In Formula IV, x can range from about 1 to about 10, in embodiments from about 1 to about 9, in embodiments from about 3 to about 6, and n can be from about 1 to about 1000, or from about 2 to about 900, or from about 5 to about 500. As disclosed here, the backbone portion of the photochromic polymer having formula I and the exemplary polymer binder of Formula VI can be "similar type polymers".

In various embodiments, the ink composition can include any other suitable polymer binders, such as, for example, polyalkylmethacrylates, polycarbonates, polystyrenes, polysulfones, polyethersulfones, polyarylsulfones, polyarylethers, polyolefins, polyacrylates, polyvinyl derivatives, cellulose derivatives, polyurethanes, polyamides, polyimides, polyesters, silicone resins, epoxy resins, polyvinyl alcohols, polyacrylic acids and the like. Copolymer materials such as polystyrene-acrylonitriles, polyethylene-acrylates, vinylidenechloride-vinylchlorides, vinylacetate-vinylidene chlorides, styrene-alkyd resins can also be used. The copolymers can be block, random, or alternating copolymers.

In various embodiments, the photochromic polymers can have a glass transition temperature in the range of about 30° C. to about 150° C., in some case in the range of about 30° C. to about 125° C., and in some other cases in the range of about 30° C. to about 100° C. While not intending to be bound by any specific theory, it is believed that the photochromic polymers undergoes a thermally gated photochromic reaction at or above the glass transition temperature ($T_g$) of the photochromic polymers, i.e., the color of the photochromic molecule or the photochromic moieties (PM) changes at or above $T_g$ but does not change below $T_g$. This is because the geometrical structural change is required for the color change of the photochromic moieties (PM) and such molecular motion can be frozen below $T_g$. The temperature dependent photochromism of the photochromic polymer not only enables a longer image lifetime but also provides less background coloration in ambient condition.

Hence, a property that should be controlled is $T_g$ of the photochromic polymers. Since the thermal decoloration reaction of the photochromic molecule, i.e. the erasure of the visible image, begins to dominate at temperatures above about 70° C. while coloration reaction (formation of visible image) can occur via radiant energy exposure, it is preferable for the photochromic polymer to have a glass transition temperature ($T_g$) of below about 70° C. At the same time, the frozen mechanism of polymer backbone of the photochromic polymer should work at room temperature. Consequently, target $T_g$ of the photochromic polymer should preferably be in the range of about 30° C. to about 70° C. There are many synthetic polymers available which show $T_g$ in that range such as, for example, nylon, polyethylene, polystyrene, poly (acrylate), and poly(methacrylate). Hence, $T_g$ of the photochromic polymer including such polymers can be precisely controlled by choosing proper one or more monomers or varying monomer combination and ratio for copolymers.

In accordance with another embodiment, there is an ink composition, in particular, particulate based ink composition, including particles dispersed in a carrier medium, the carrier medium including one or more volatile non-solvents. Any suitable volatile non-solvents can be used, such as, for example, water, glycerol, diethylene glycol, polyethylene oxides, and the like. The particulate based ink composition can also include surfactants such as, for example, Dowfax™ (The Dow Chemical Company, Midland, Mi), Surfynol® (Air Products and Chemicals Europe BV, Utrecht, The Netherlands), and the like. The particles can have any suitable size, such as in the range of about 10 nm to about 50 μm or in the range of about 20 nm to about 10 μm or in the range of about 50 nm to about 0.5 μm.

In various embodiments, the particles can include the one or more photochromic species. In certain embodiments, the ink composition can include only the photochromic polymers having formula I. In other embodiments, the particles can include photochromic polymers having formula IV. In some other embodiments, the particles can include both photochromic polymers having formula I and IV. In certain embodiments, the particles can further include an optional polymer binder of formula VI. Yet in certain embodiments, the particles can include a mixture of one or more of monomeric photochromic molecules, photochromic oligomers, photochromic polymers, and polymer binder.

Any suitable monomeric photochromic molecule can be used for the ink compositions, such as, for example, spiropyrans, spirooxazines, thiospiropyrans, benzos, naphthopyrans, stilbenes, azobenzenes, bisimidazols, spirodihydroindolizines, quinines, perimidinespirocyclohexadienones, viologens, fulgides, fulgimides, diarylethenes, hydrazines, anils, aryl thiosulfonates, spiroperimidines, and mixtures thereof.

In various embodiments, the oligomeric photochromic molecule present in the ink compositions can include a plurality of spiropyran groups covalently linked together by a linker. Exemplary linkers can include, but are not limited to:

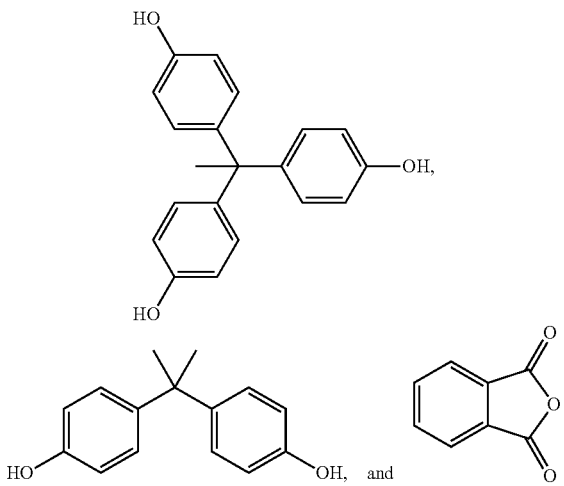

In certain embodiments, the ink compositions of the present disclosure can also include additional optional ingredients, including, but not limited to, pH modifiers, humectants to retard premature drying, polymeric resins to impart binding and allied properties, defoamer/antifoaming agents to regulate foam efficiency, wetting agents such as surfactants to control surface properties, biocides to inhibit the fungal and bacterial growth that lead to fouling, and thickeners or rheology modifiers to control ink application.

The ink compositions of the present disclosure can be used for a wide variety of applications. In some embodiments, a writing instrument can contain one or more of the disclosed ink compositions in the colored state. Exemplary writing instruments can include, but are not limited to, a fountain pen, a ballpoint pen, a rollerball pen, a felt-tip pen, a gel pen, a dip pen, a quill, and a reed pen. In various embodiments, the writing instruments can include an ink reservoir, the ink reservoir containing at least one of the ink compositions of the present disclosure in the colored state and a tip connected to the ink reservoir, such that the ink is dispensed through the tip. In various embodiments, the ink reservoir can be opaque to prevent ambient light from entering inside the reservoir and decreasing the colored ink lifetime. Any suitable tip can be used, including, but not limited to, a conventional nib, a ball point tip, a roller ball tip, and a felt tip.

In other embodiments, an ink cartridge can contain one or more of the disclosed ink compositions in the colored state. In some other embodiments, a printer can include one or more of the ink compositions of the present teachings in the colored state.

The ink compositions of the present disclosure can be exposed to one or more of radiant energy and thermal energy before loading into one of the writing instruments, ink cartridges, or the printers, where it can remain colored and can have very long lifetime in the colored state. The ink compositions of the present disclosure can be written using either the writing instrument or the printer on a conventional media or on an erasable media. Erasable media are described in detail in U.S. Pat. No. 7,229,740 and U.S. patent application Ser. Nos. 12/400,276; 12/327,882; 12/571,881; 12/603,227, the disclosures of which are incorporated by reference herein in their entirety. On the erasable media, annotation made using the ink compositions of the present disclosure can have similar fade kinetics as the rest of the erasable media. An advantage of the ink compositions of the present disclosure is the elimination of a UV LED to color the ink in the writing instrument, thereby reducing size and cost and making the writing instrument and in addition safer to use. The ink compositions of the present disclosure could have high business value as a consumable for use in a reusable paper environment.

In accordance with various embodiments, there is a method of writing an erasable annotation. The method can include providing an ink, wherein the ink can be selected from the group consisting of a solvent based ink and a particulate based ink, wherein the ink exhibits a reversible transition from a colorless state to a colored state upon exposure to one or more of a thermal energy and a radiant energy. The method can also include exposing the ink to one or more of a temperature in the range of about 30° C. to about 150° C. and a radiant energy in the range of about 200 nm to about 475 nm to form a colored ink and providing a device including a reservoir. The method can further include filling up the reservoir with the colored ink and forming a visible image on a media using the device. In various embodiments, the method can also include erasing the visible image by exposing to a temperature in the range of about 70° C. to about 200° C. and forming a visible image on a media using the device.

In various embodiments, the step of providing an ink can include providing a solvent based ink, the solvent based ink including one or more photochromic species dissolved in a carrier medium. In some embodiments, the one or more photochromic species can include photochromic polymers having formula I. In other embodiments, the one or more photochromic species can include photochromic polymers having formula IV. In other embodiments, the one or more photochromic species can include a mixture of one or more of monomeric photochromic molecules, photochromic oligomers, photochromic polymers, and polymer binder. In certain embodiments, the step of forming a visible image on a media using the device can include forming a visible image on an erasable media such as, for example, erasable media describe in U.S. patent application Ser. Nos. 12/571,881, 12/327,882, the disclosures of which are incorporated by reference in entirety. Furthermore, in some embodiments, the ink and the erasable media can include the substantially similar photochromic polymers, thereby providing same fade kinetics of the annotation made by the ink and the visible image printed on the erasable medium.

In certain embodiments, the step of providing an ink can include providing a particulate based ink, the particulate based ink including a plurality of particles dispersed in one or more volatile non-solvents. Any suitable volatile non-solvents can be used, such as, for example, water, glycerol, diethylene glycol, polyethylene oxides and the like. In some embodiments, the particles can include the one or more photochromic polymer systems having formula I. In other embodiments, the particles can include the one or more photochromic polymer systems having formula IV. In certain embodiments, the particles can further include an optional polymer binder of formula VI. In certain embodiments, the one or more photochromic species can include a mixture of one or more of monomeric photochromic molecules, photochromic oligomers, photochromic polymers, and polymer binder.

According to another embodiment, there is a method of refilling a print cartridge. The method can include providing a print cartridge, the print cartridge including a print head having a plurality of nozzles, an outlet, and a reservoir. The method can also include opening the outlet and removing contents of the reservoir through one or more of the outlet and the plurality of nozzles. The contents can include one or more of gas and residual ink. The method of refilling a print cartridge can further include connecting the one or more of the outlet and the plurality of nozzles with an ink supply, the ink supply including a colored ink selected from the group consisting of a solvent based ink and a particulate based ink. In various embodiments, the colored ink can exhibit a reversible transition from a colorless state to a colored state upon exposure to one or more of a temperature in the range of about 30° C. to about 150° C. and a radiant energy. The method can further include filling the reservoir with the colored ink and sealing the outlet.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. The term "at least one of" is used to mean one or more of the listed items can be selected.

Other embodiments of the present teachings will be apparent to those skilled in the art from consideration of the specification and practice of the present teachings disclosed herein. It is intended that the specification and examples be considered as exemplary only, with a true scope and spirit of the present teachings being indicated by the following claims.

What is claimed is:

1. An ink composition comprising:
  a carrier medium comprising one or more hydrogen bonding solvents selected from the group consisting of benzoic acid, butanol, isopropyl alcohol, lauric acid, myristic acid, octanoic acid and palmitic acid; and
  one or more photochromic species in the carrier medium, and
  wherein each of the one or more photochromic species exhibits a reversible transition from a colorless state to a colored state upon exposure to a radiant condition wherein the radiant condition is selected from the group consisting of:
  a radiant energy in the range of about 200 nm to about 475 nm; and
  a radiant energy in the range of about 200 nm to about 475 nm and a temperature in the range of about 30° C. to about 150° C.,
  wherein the one or more photochromic species include a random or block copolymer having the following general formula:

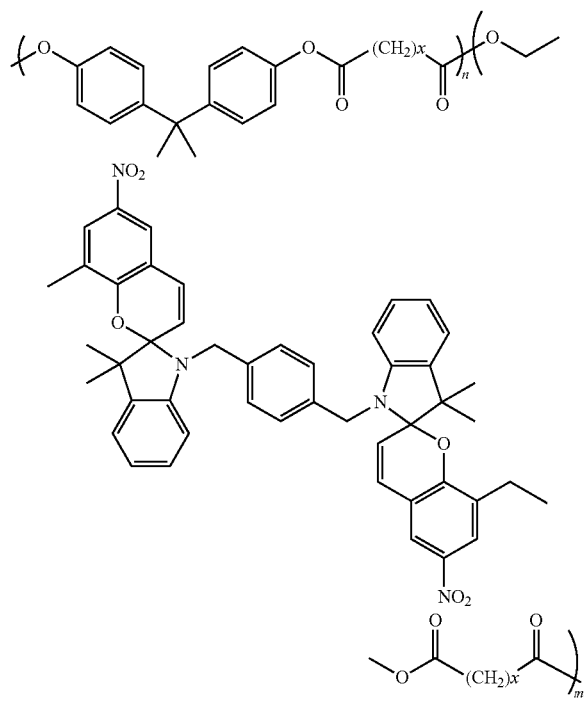

wherein x ranges from about 1 to about 10, m ranges from about 1 to about 1000, and n ranges from 0 to about 1000.

2. The ink composition of claim 1, wherein the ink in the colored state has an image lifetime of at least about 24 hours.

3. The ink composition of claim 1, wherein the ink in the colored state changes to a colorless state upon exposure to a temperature in the range of about 70° C. to about 200° C.

4. The ink composition of claim 1, wherein the carrier medium comprises one or more volatile solvents selected from the group consisting of tetrahydrofuran, trichloro- and tetrachloroethane, dichloromethane, chloroform, monochlorobenzene, toluene, acetone, methanol, ethanol, xylene, benzene, ethyl acetate, propylene glycol, propyl alcohol, toluene, glyco-ethers, and the like.

5. The ink composition of claim 1, wherein each of the one or more photochromic species comprises one or more photochromic moieties (PM) selected from the group consisting of spiropyrans, spirooxazines, thiospiropyrans, benzos, naphthopyrans, stilbenes, azobenzenes, bisimidazols, spirodihydroindolizines, quinines, perimidinespirocyclohexadienones, viologens, fulgides, fulgimides, diarylethenes, hydrazines, anils, aryl thiosulfonates, spiroperimidines, and mixtures thereof.

6. The ink composition of claim 1, wherein at least one of the one or more photochromic species is in the form of particles, the particles having a size in the range of about 10 nm to about 50 µm.

7. The ink composition of claim 6, wherein the carrier medium comprises one or more volatile non-solvents selected from the group consisting of water, glycerol, diethylene glycol, polyethylene oxides, and the like.

8. The ink composition of claim 1 further comprising an optional polymer binder with general formula:

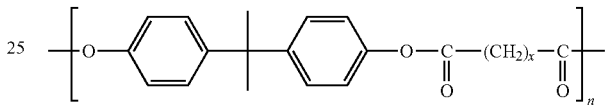

wherein x ranges from about 1 to about 10 and n ranges from about 1 to about 1000.

9. The ink composition of claim 1 further comprising additional optional ingredients selected from the group consisting of pH modifiers, humectants, defoamer/antifoaming agents, wetting agents, biocides, and thickeners or rheology modifiers.

10. A printer comprising: an ink composition, the ink composition comprising a carrier medium; and one or more photochromic species in the carrier medium, wherein the ink is in a colored state.

11. The printer of claim 10, wherein the one or more photochromic species include the colored state of a random or block copolymer having the following general formula:

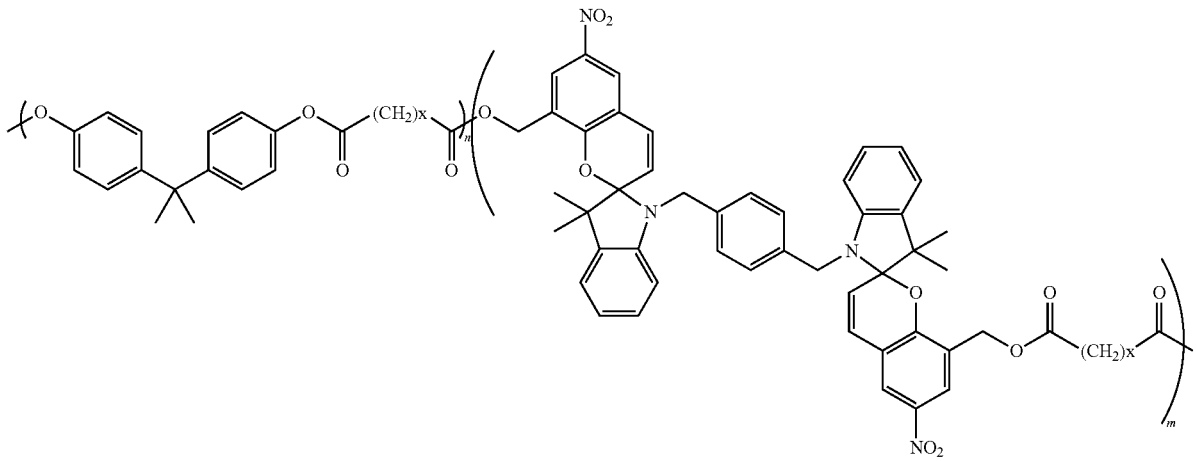

wherein x ranges from about 1 to about 10, m ranges from about 1 to about 1000, and n ranges from 0 to about 1000.

* * * * *